(12) United States Patent
Tran et al.

(10) Patent No.: US 8,943,554 B2
(45) Date of Patent: Jan. 27, 2015

(54) MANAGING TETHERED DATA TRAFFIC OVER A HOTSPOT NETWORK

(75) Inventors: Dzung Tran, Purcellville, VA (US); Kevin Warmerdam, Encinitas, CA (US); Thanh Lim, Arcadia, CA (US); Ryan MacPherson, Decatur, GA (US); Bikramjit Singh, Carlsbad, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 30 days.

(21) Appl. No.: 13/422,881

(22) Filed: Mar. 16, 2012

(65) Prior Publication Data

US 2012/0240197 A1 Sep. 20, 2012

Related U.S. Application Data

(60) Provisional application No. 61/454,480, filed on Mar. 18, 2011.

(51) Int. Cl.
*G06F 7/04* (2006.01)
*H04L 29/06* (2006.01)
*H04W 12/08* (2009.01)
*H04W 4/00* (2009.01)
*H04W 84/12* (2009.01)
*H04W 88/04* (2009.01)

(52) U.S. Cl.
CPC ........... *H04W 12/08* (2013.01); *H04L 63/1416* (2013.01); *H04W 4/00* (2013.01); *H04W 4/001* (2013.01); *H04W 84/12* (2013.01); *H04W 88/04* (2013.01)
USPC .................................................. 726/4; 726/1

(58) Field of Classification Search
USPC ................ 726/4, 3, 5, 6, 1, 8, 9; 455/7, 9, 95
See application file for complete search history.

(56) References Cited

U.S. PATENT DOCUMENTS

| | | | |
|---|---|---|---|
| 6,496,979 B1* | 12/2002 | Chen et al. | 717/178 |
| 7,239,865 B2* | 7/2007 | Dyck et al. | 455/411 |
| 2003/0035397 A1 | 2/2003 | Haller | |
| 2004/0193513 A1* | 9/2004 | Pruss et al. | 705/30 |
| 2005/0076245 A1* | 4/2005 | Graham et al. | 713/201 |
| 2006/0153122 A1 | 7/2006 | Hinman | |
| 2006/0174001 A1* | 8/2006 | Zhu | 709/225 |
| 2008/0066157 A1* | 3/2008 | Stevens et al. | 726/4 |

(Continued)

FOREIGN PATENT DOCUMENTS

EP 1 858 217 11/2007

*Primary Examiner* — Abu Sholeman
(74) *Attorney, Agent, or Firm* — Farjami & Farjami LLP

(57) ABSTRACT

Presented is a system and method for controlling access to a mobile hotspot on a mobile device utilizing a hotspot management application. The method includes detecting unauthorized data traffic over a tethered link between the mobile device and a tethered device by analyzing a signature of the unauthorized data traffic. Analyzing the signature of the unauthorized data traffic may be carried out utilizing a rules engine, where the rules engine is based on one or more carrier controlled tethering policies and one or more user controlled tethering policies. Detecting unauthorized data traffic may further include detecting an unauthorized tethering application on the mobile device utilizing a database of known unauthorized tethering applications. The method further includes controlling the unauthorized data traffic. The method additionally includes redirecting a user of the mobile device to a captive portal for authorized tethering plan support.

14 Claims, 4 Drawing Sheets

(56) References Cited

U.S. PATENT DOCUMENTS

| | | | |
|---|---|---|---|
| 2009/0282127 A1* | 11/2009 | Leblanc et al. | 709/219 |
| 2010/0034124 A1* | 2/2010 | Payyappilly et al. | 370/310 |
| 2010/0035589 A1* | 2/2010 | Wormald et al. | 455/414.1 |
| 2010/0188975 A1 | 7/2010 | Raleigh | |
| 2012/0065871 A1* | 3/2012 | Deshpande et al. | 701/118 |
| 2012/0113857 A1* | 5/2012 | Narayanaswamy et al. | 370/252 |
| 2012/0120799 A1* | 5/2012 | Brisebois et al. | 370/231 |
| 2012/0131685 A1* | 5/2012 | Broch et al. | 726/30 |
| 2012/0166281 A1* | 6/2012 | Sartipi | 705/14.54 |
| 2013/0337774 A1* | 12/2013 | Johnson | 455/411 |
| 2014/0098671 A1* | 4/2014 | Raleigh et al. | 370/235 |

* cited by examiner

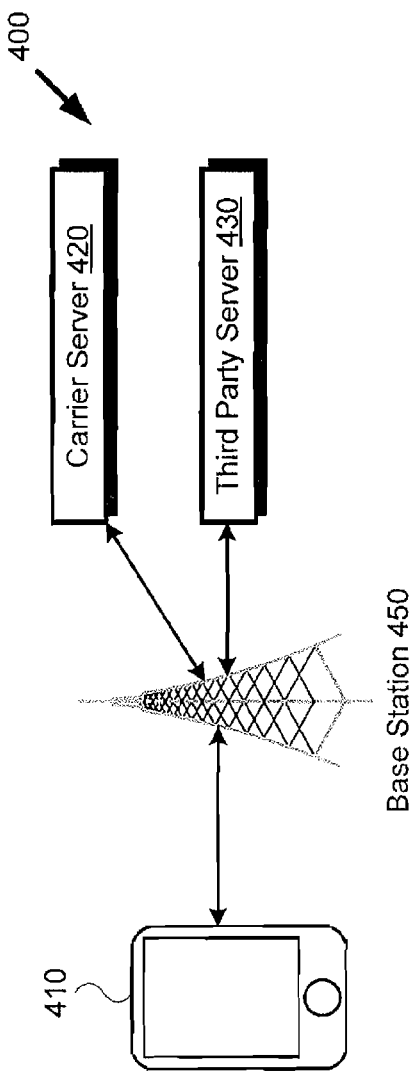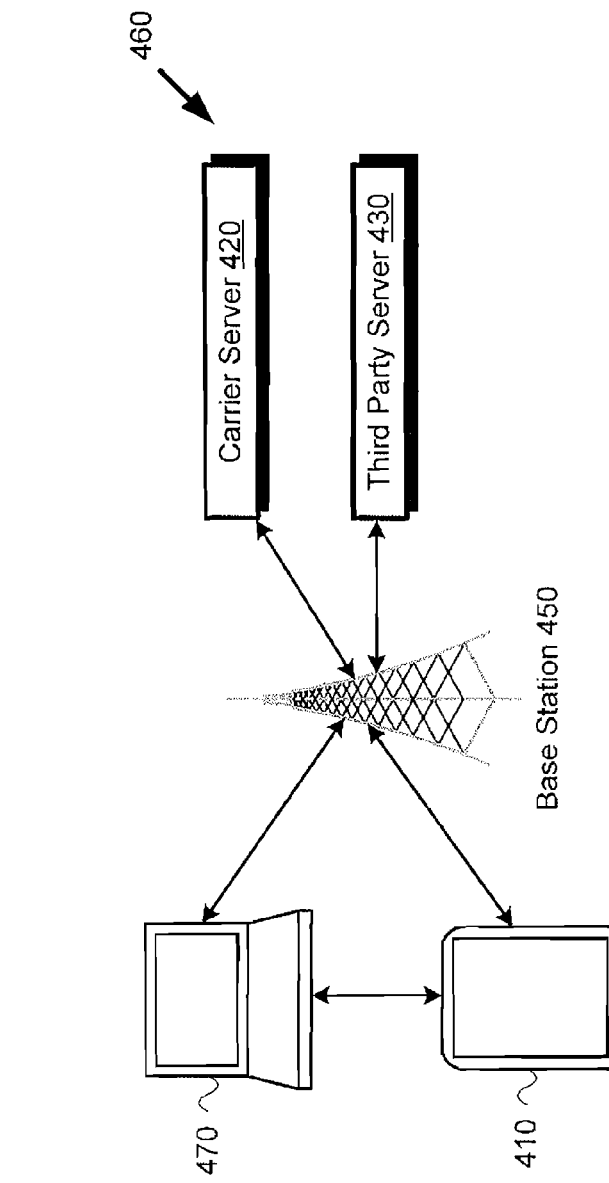
Fig. 4A
Fig. 4B

US 8,943,554 B2

MANAGING TETHERED DATA TRAFFIC OVER A HOTSPOT NETWORK

RELATED APPLICATIONS

This application claims priority of U.S. Provisional Application No. 61/454,480 filed on Mar. 18, 2011, which is hereby incorporated by reference in its entirety.

BACKGROUND

Mobile devices having tethering capabilities are common in today's device landscape. As third party applications for such mobile devices continue to advance, turning a mobile device into a mobile hotspot has become considerably easier. Several third party applications for mobile devices now allow consumers to piggy back data plans, designed for smart phone use, to create a mobile hotspot for use by other devices such as laptops and tablets. However, the data consumption profile of mobile devices used as unauthorized mobile hotspots results in significant carrier revenue leakage from the loss of authorized hotspot service revenue. Revenue leakage is especially pronounced where unauthorized tethered connections are used on mobile devices having unlimited or high-tiered data plans targeted for smartphone-only data usage. In addition, unauthorized usage of mobile devices as mobile hotspots makes it difficult for enterprises to manage their costs for data usage across their mobile device inventory.

SUMMARY OF THE INVENTION

The present disclosure is directed to managing tethered data traffic over a hotspot network, substantially as shown in and/or described in connection with at least one of the figures, and as set forth more completely in the claims.

BRIEF DESCRIPTION OF THE DRAWINGS

FIGS. 4A and 4B show exemplary systems for supporting download, installation, and update of a hotspot management application on a mobile device, according to implementations of the present invention.

DETAILED DESCRIPTION

Figure 1A:
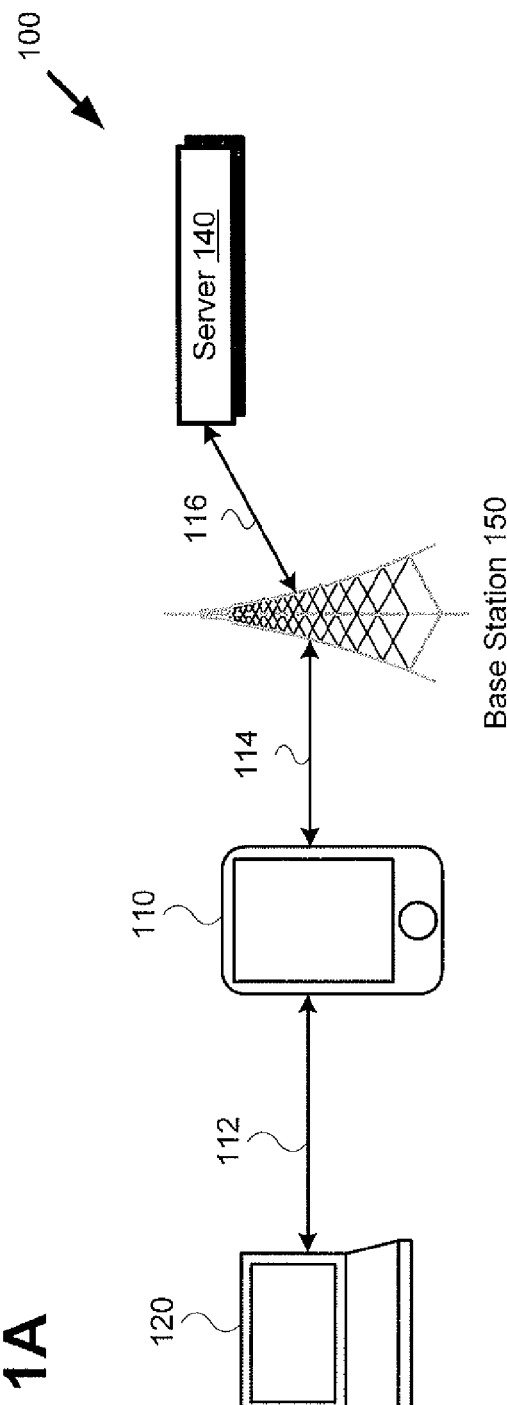
FIG. 1A presents an exemplary system for controlling access to a mobile hotspot utilizing a hotspot management application, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A presents an exemplary system for controlling access to a mobile hotspot utilizing a hotspot management application, according to one implementation. As shown in FIG. 1, system 100 may include mobile device 110, tethered device 120, base station 150, and network server 140, for example. Mobile device 110 may be any type of mobile device, such as a smartphone, tablet, laptop, personal computer, or personal digital assistant (PDA), for example. Mobile device 110 may act as a mobile hotspot for one or more tethered devices, for example tethered device 120. Mobile device 110 may further include a hotspot management application, which provides policy-driven, control over subordinate tethered connections to mobile device 110, such as at the kernel level of the operating system of mobile device 110. Mobile device 110 may communicate with tethered device 120 via tethered connection 112, which may be any IP-based connection, without limitation, such as a USB connection, a Bluetooth connection, a WiFi AP connection, a WiFi direct connection or an Ethernet connection. Utilizing mobile device 110 as a mobile hotspot, tethered device 120 may communicate with base station 150 over wireless wide area network (WWAN) connection 114. As will be discussed in greater detail below, the hotspot management application within or otherwise provided to the mobile device 110 may provide policy-driven control over any tethered connections to mobile device 110. Thus, the present application provides a way in which a carrier may prevent users from extending data connectivity, via tethering, through the use of non-approved mobile hotspot applications on mobile devices.

Figure 1B:
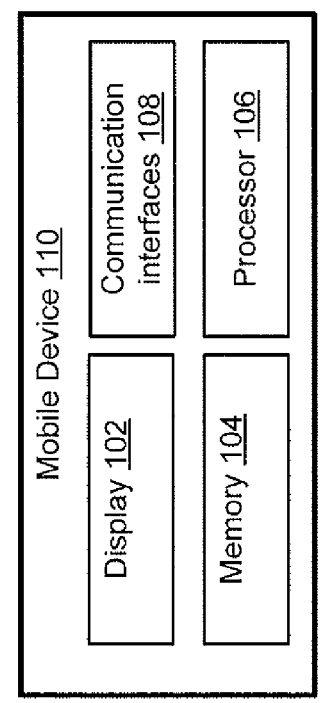
FIG. 1B presents an exemplary mobile device including a hotspot management application for controlling access to a mobile hotspot, according to one implementation.

FIG. 1B presents an exemplary mobile device including a hotspot management application for controlling access to a mobile hotspot, according to one implementation. For example, mobile device 110 may include display 102, memory 104, processor 106, and communication interfaces 108, for example. Display 102 may be configured to display any communications to or from mobile device 110, as required by one or more implementations of the present application. Memory 104 may be configured to store a hotspot management application, as set forth by one or more implementations of the present application, as well as any other information that may be utilized by mobile device 110, for example. Processor 106 may be configured to carry out any required calculations, procedures or processes for controlling access to a mobile hotspot on mobile device 110, as set forth by one or more implementations of the present application. Finally, communication interfaces 108 may be configured to provide a mobile hotspot by establishing wireless or wired connections to and from mobile device 110.

Figure 2:
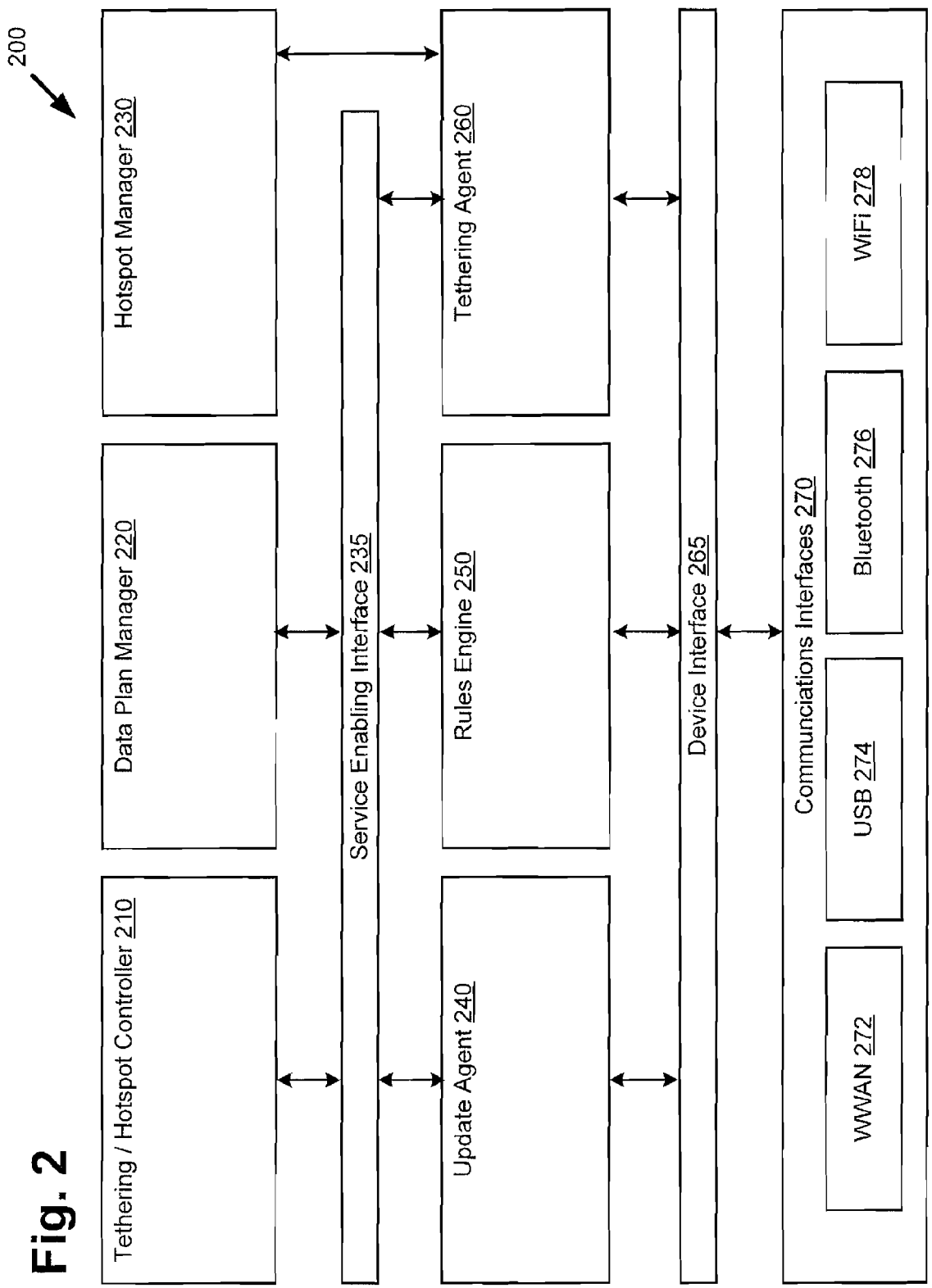
FIG. 2 presents an exemplary diagram of the architecture of a mobile device including a hotspot management application for controlling access to a mobile hotspot, according to one implementation.

FIG. 2 presents an exemplary diagram of the architecture of a mobile device including a hotspot management application for controlling access to a mobile hotspot, according to one implementation. Mobile device 200 of FIG. 2 may include communications interfaces 270 configured to transmit and receive wireless or wired signals in a plurality of formats. Thus, mobile device 200 may include, for example, a wireless wide area network (WWAN) interface 272, a USB interface 274, a Bluetooth interface 276 and a WiFi interface 278, for example. In one implementation, mobile device 200 may directly control each of the communications interfaces 270 such that no data traffic may transfer from one interface to another interface without the proper policy in place.

Device interface 265 may be a software and/or hardware interface allowing communication between communications interfaces 270 and higher-level software layers, for example. Three core modules may allow mobile device 200 to control the WWAN radio and how it is bridged to one or more of the other communications interfaces: update agent 240, rules engine 250, and tethering agent 260.

Update agent 240 is a powerful device management (DM) platform which may communicate with an external DM server supporting common DM types such as the software component management object (SCOMO) and/or the firmware update management object (FUMO), thus allowing remote installation, uninstallation, activation and deactivation of software components on mobile device 110, for example. Such a DM server may be shown as server 140 of FIG. 1, for example. For the present implementation, the hotspot management application must always be operational on a mobile device. Thus, update agent 240 may include custom extensions allowing the hotspot management application to be automatically updated, or reinstalled in the event that portions or all of the application are uninstalled, damaged, altered or deleted. Such custom extensions may include the use of an installation bootstrap engine, which may ensure the integrity of the entire hotspot management application by facilitating automatic reinstallation of any missing or damaged portions of the hotspot management application. The installation bootstrap engine may operate to reinstall or update specific modules in the proper locations on mobile device 110, for example, rather than the entire hotspot management application when appropriate. The installation bootstrap engine may utilize a difference engine to determine which modules of the hotspot management application are missing, altered or damaged.

Additionally, the installation bootstrap engine may review the hotspot application to ensure all modules are properly installed through the use of a integrity signature approach, such that a run-time computed integrity signature for the hotspot management application will be computed and validated against the pre-shared authentic integrity signature using all necessary modules of the hotspot management application installed and/or present on the mobile device. When the hotspot management application is properly installed on the mobile device, the signature computed by the bootstrap engine will match with the pre-installed authentic integrity signature resident on the device and reported to the server. The computed key information may be sent to the network server occasionally for verification or when requested by the server. Where the network server detects that tethered data traffic is or has recently been active but the particular signature is not received by the mobile device, the network server may determine that the hotspot management application is not properly installed or has been compromised and initiate a push to the mobile device for immediate application reinstallation. Alternatively, the properly installed hotspot management application may provide the authentic integrity signature as a part of network authentication of the mobile device with the carrier network in general. Thus, each time the mobile device attempts to connect to the carrier network, proper installation of the hotspot management application may be ensured. Where the authentic integrity key is not provided, the network server may initiate a push to the mobile device for immediate application and integrity key reinstallation.

Rules engine 250 may control how communications interfaces 270 are bridged to one another. The operation of rules engine 250 may be based on one or more carrier controlled tethering policies and/or one or more mobile device user controlled tethering policies. For example, a carrier may set a policy for mobile devices that no tethering is allowed without an authorized tethering data plan, or that USB or Bluetooth tethering is allowed, while WiFi-based soft access point tethering is not. Rules engine 250 may determine whether the particular mobile device is signed up for an authorized tethering data plan and may then determine which of the communications interfaces are being utilized to tether another device to the mobile device and apply the appropriate carrier-based policy. Additional examples of such carrier-based policies may include, without limitation, limiting a maximum number of subordinate connections to a mobile device, otherwise limiting or shaping the behavior of subordinate connections to the mobile device, as well as policies concerning redirection to custom web portals or pages upon a detection of an unauthorized tether to the mobile device. Such carrier-based policies may not be overridden by the mobile device user. According to the specific carrier-based policies in place, rules engine 250 may determine whether the detected data traffic or tethering application is unauthorized, and if so, direct that the data traffic be limited or disabled. Similarly, rules engine 250 may incorporate mobile device user-based policies, which may be applied subsequent to the carrier-based policies. Such user-based policies will be further discussed with regard to hotspot manager 230 below.

Tethering agent 260 may control the actual bridging of one or more of communications interfaces 270 to WWAN interface 272. For example, once rules engine 250 has determined whether tethering another device to the mobile device is appropriate in a current set of circumstances, tethering agent 260 may facilitate the actual connection/disconnection of WWAN interface 272 to/from one or more of USB interface 274, Bluetooth 276, or WiFi interface 278, for example.

Service enabling interface 235 may be a software and/or hardware interface facilitating communication between deeper-level modules, such as update agent 240, rules engine 250 and tethering agent 260, and modules handling a user interface and other high level business and user related functions.

Tethering/hotspot controller 210 may control the user interface used to manage mobile device 200. For example, tethering/hotspot controller 210 may configure aspects such as a service set identifier (SSID), wired equivalent privacy (WEP) security protocols, as well as facilitating the utilization of a central threat database containing a constantly updated listing of applications known to facilitate unauthorized tethering on mobile devices. In this way, known threats together with carrier and user based tethering/hotspot policies may allow mobile device 200 to determine when an unauthorized third party application is attempting to facilitate tethering.

Figure 3:
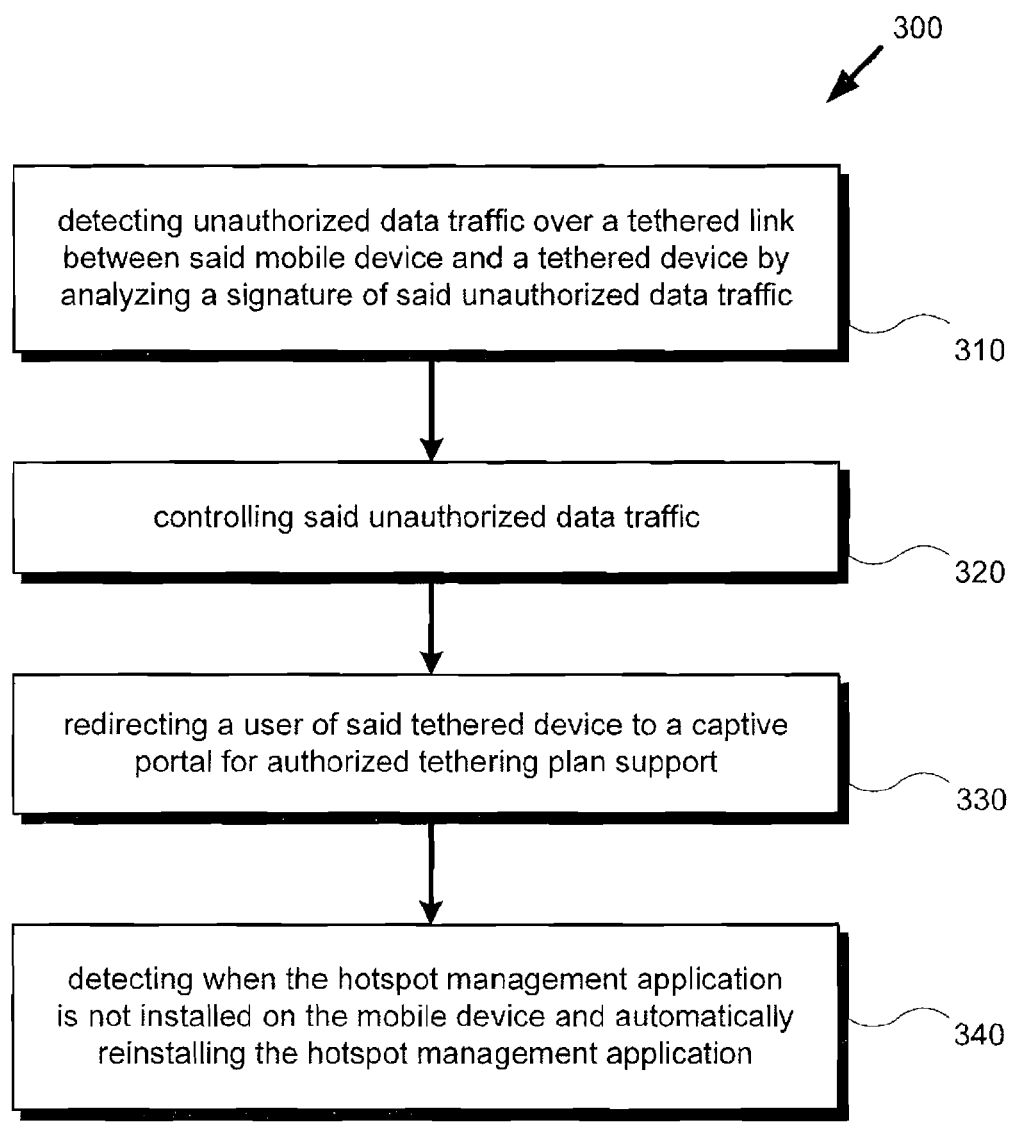
FIG. 3 presents an exemplary flowchart illustrating a method for controlling access to a mobile hotspot on a mobile device utilizing a hotspot management application, according to one implementation.

As will be disclosed in more detail by flowchart 300 of FIG. 3, once a tethering threat is detected, and after tethering agent 260 has disconnected WWAN interface 272 from the other communications interfaces, data plan manager 220 may facilitate redirecting the user/user device (e.g., tethered device) to a captive portal or other user interface where the user of either the mobile device or the user of the tethered device may be offered a support tethering solution and data plan from the carrier.

Hotspot manager 230 may include features that allow the mobile device user to manage the mobile device as a carrier-authorized hotspot in a number of ways. For example, hotspot manager 230 may provide guest management by allowing for the creation and configuration of guest connections to the mobile device including determining how those connections may be accessed, how often, at what rate, and even what web pages are allowed to be accessed through mobile device 200. In addition, hotspot manager 230 may allow a guest connection that complies with carrier-controlled policies already in place to be created by entering a key into a tethered device connected to mobile device 200, for example. Entering the key may allow the tethered device to access mobile device 200 as a mobile hotspot, for example, subject to any user-controlled tethering policies in place either globally, or specifically tailored to that particular key.

Because tethered data traffic between a mobile device's WWAN interface and one or more of the mobile device's other interfaces, such as USB, Bluetooth, WiFi, or Ethernet may comprise IP-based packets of data, the hotspot management application may utilize a packet filter driver to facilitate the packet processing required by one or more of the above described modules of the hotspot management application. Such a packet filter driver may be stored in memory of the mobile device, for example, memory 104 of mobile device 110. Thus, such a driver may facilitate the detection of tethering activity on the mobile device by rules engine 250, for example. The driver may also facilitate the interception of the tethering activity by tethering agent 260 and redirection of the tethered session via data plan manager 230, for example. As packet data is filtered, such data may be transformed as required to enable tracking of any tethering activity or attempted tethering activity on the mobile device. Such tracking may include, without limitation, identities of tethered devices, identities of applications used for such unauthorized tethering, as well as the frequency, duration and amount of data transferred during each session. Such tracking may accordingly allow carriers to evaluate the efficacy of installed policies as well as apprise mobile device users of how much bandwidth is being tethered and by what tethered devices, for example. Such a driver may additionally facilitate the shaping or limiting of bandwidth as controlled by one or more of the above described modules of the hotspot management application.

FIG. 3 presents an exemplary flowchart illustrating a method for controlling access to a mobile hotspot on a mobile device utilizing a hotspot management application, according to one implementation. Action 310 of flowchart 300 includes detecting unauthorized data traffic over a tethered link between the mobile device and a tethered device by analyzing a signature of the unauthorized data traffic. A signature of any traffic may be acquired through monitoring of any data traffic being transferred between a WWAN connection of the mobile device, such as 2G, 3G, 4G, or 4G LTE for example, and any other IP-based connection, such as USB, Bluetooth, WiFi or Ethernet, for example. Such analysis and detection may be carried out within the mobile device itself, for example. Aspects of such data traffic monitored may include, without limitation, "time to live" (TTL) values, "type of service" (ToS) values, differentiated service code point (DSCP) values, a tunneling type, or any other IP header information associated with the transferred data, for example. Traffic signatures acquired may be further logged with a traffic signature database to dynamically build a collection of traffic signatures, which may be distributed to other hotspot management applications on other mobile devices for accurate identification of unauthorized tethered traffic. Additionally, the traffic signatures may be logged for the purpose of tracking subordinate tethered traffic and to provide a record of data traffic transfers or attempted data traffic transfers to or from a particular mobile device. Thus, where laws or terms of service prohibit an application from automatically uninstalling or shutting down an unauthorized program, a carrier may still have access to a log of threatening data transfer behavior associated with each mobile device serviced by the carrier.

A signature of unauthorized data traffic over the tethered link may additionally, or alternatively, include determining the identity of an unauthorized third party tethering or hotspot application itself that may be executing on the mobile device. For example, such an application signature may include, without limitation, an MD5/SHA-1 hash of the unauthorized application's binary, an executable filename, or the brand product name of the application, for example. Such an application signature may be used as a look up into entries in a central threat database, which may contain a constantly updated listing of applications known to facilitate unauthorized tethering on mobile devices. Alternatively, such a threat database may be maintained and continuously updated within the mobile device itself.

Once an unauthorized application and/or unauthorized tethered data traffic has been identified, the application and/or data traffic may be disabled or limited, according to a policy and rules engine within the hotspot management application on the mobile device. The operation of the policy and rules engine may be based on one or more carrier-controlled tethering policies and/or one or more mobile device user-controlled tethering policies. For example, a carrier may set a policy for mobile devices it services that no tethering is allowed on any mobile device without a tethering data plan. In the alternative, the carrier may set a policy that only USB tethering is allowed and that WiFi tethering is not allowed, for example. In such a situation, the rules engine may apply such policies and accordingly determine whether the detected data traffic or tethering application is unauthorized.

Similarly, the operation of the policy and rules engine may be based on one or more tethering policies set by the user of the mobile device. Thus, once the carrier controlled tethering policies have been complied with, a user of a mobile device may control features such as creating and configuring separate guest connections to the mobile device. Such configuration of separate guest connections may include defining the types of connections that may be used for tethering, how often and for how long those connections may be established, caps on the amount of data which may be transferred, and at what data rates. The user of the mobile device may additionally define a whitelist and/or blacklist of websites that may or may not be accessed using the mobile device as a mobile hotspot or tether.

Continuing to action 320 of flowchart 300, action 320 includes controlling the unauthorized data traffic. For example, if a particular mobile device does not subscribe to a tethered data plan with the carrier, the carrier-controlled "no unauthorized tethering" policy may be applied by the rules engine to determine that tethered data traffic between the mobile device's WWAN interface and WiFi interface is unauthorized, for example. In such a situation, the hotspot management application may disable the unauthorized data traffic by any appropriate method. For example, the hotspot management application may shut down or uninstall the unauthorized third party tethering application. The unauthorized application's traffic may alternatively be directed to a null port within the mobile device, or the data traffic may be otherwise dropped.

In the case where tethered data traffic complies with appropriate carrier-controlled tethering policies but conflicts with user-controlled tethering policies, the hotspot management application may appropriately limit or disable a particular tethered device's traffic through the mobile device. For example, a mobile device user may have set a policy that only a particular tethered device may utilize the mobile device as a hotspot and only at a prescribed data rate or capped at a particular data amount. In such a situation, the rules engine, for example, rules engine 250 of FIG. 2, may determine that tethered data transfers at speeds greater than those set by the mobile device user, or data transfers over the capped amount, are to be limited or disabled. Thus, the present implementation allows for both carrier and user control of the tethering and hotspot capabilities of the mobile device.

Action 330 includes redirecting a user of the tethered device to a captive portal for authorized tethering plan support. Where unauthorized data traffic is disabled or limited, the offending user may be redirected to a captive portal, which may display one or more carrier-authorized tethering data plans to the mobile device user. In addition, or in the alternative, a user of the tethered device may be redirected to a webpage or display, which presents information as to why the tethered connection was disabled or limited. For example, if a tethered device user is authorized to tether to the mobile device but has exceeded a total data transfer limit, a display may inform the tethered device user that the total data transfer limit has been reached and that further data transfer via tether has been disabled or limited. Such a captive portal may be hosted directly on the mobile device, or in the alternative, the captive portal may be hosted remotely on a server.

A common practice to remove limitations on applications and operating systems of mobile devices is a process known as jailbreaking. When a mobile device is jailbroken, custom kernels within the operating system are loaded or limiting portions of the operating system are deleted or altered in an effort to lift or modify the limitations of the mobile device. Jailbreaking allows users to gain root access to the operating system, allowing the mobile device users to download additional applications, extensions, or themes that are not sanctioned by the mobile device manufacturer or carrier.

To protect the integrity of the hotspot management application, an implementation of the present application includes action 340 of flowchart 300. Action 340 includes detecting when the hotspot management application has been inappropriately modified or is not installed on the mobile device and automatically reinstalling the hotspot management application or appropriate components thereof. For example, update agent 240 of FIG. 2 may detect that a portion or all of the hotspot management application has been uninstalled, damaged or deleted through the use of a tampering alert. If a tampering alert is triggered, a request may be sent over the mobile device's WWAN to push back necessary installation components to the mobile device via protocols such as SCOMO or FUMO for immediate update or repair of the hotspot management application. Where the mobile device already contains a software copy of the hotspot management application in local memory, such a copy may be used by the mobile device for immediate repair and/or reinstallation.

The present implementation may additionally include a method of delivery of the hotspot management application to a mobile device. FIGS. 4A and 4B show exemplary systems for supporting download, installation, and update of a hotspot management application on a mobile device, according to implementations of the present invention.

FIG. 4A shows system 400, which may include mobile device 410, base station 450 and one or more of carrier-hosted server 420 and third-party server 430, for example. The hotspot management application may come preloaded on mobile device 410. However, the present application contemplates solutions in which legacy mobile devices may also obtain automatic access to the hotspot management application of the present implementation, where the application does not come preloaded on the mobile device. For example, in the event that mobile device 410 does not come preloaded with the hotspot management application, to enable a hotspot a user of mobile device 410 may call carrier customer support, for example, or receive a SMS message providing a link to the hotspot management application download site. Such a download site may be hosted by either carrier-hosted server 420, third-party server 430, such as for example, the Android marketplace, or both. The user of mobile device 410 may follow the link at which time an auto-update software package containing the hotspot management application may be pushed from either carrier-hosted server 420 or third-party server 430 to mobile device 410 for installation. In such an implementation, updates to an already-installed hotspot management application may occur automatically as they become available, or may occur after user acceptance of the update. Once the hotspot management application has been installed and/or updated, the hotspot management application may attempt to verify whether the mobile device 410 is associated with a carrier-authorized hotspot or tethering data plan. If so, mobile hotspot or tethering functionality may be enabled on mobile device 410. If not, the user of mobile device 410 may be redirected to a captive portal for authorized tethering plan support.

FIG. 4B shows system 460 which may be similar to system 400 of FIG. 4A except further including laptop 470, for example. In system 460, laptop 470 may link to the hotspot management application download site. The user of laptop 470 may follow the link to the hotspot management application download site at which time an auto-update software package containing the hotspot management application may be pushed from either carrier-hosted server 420 or third-party server 430 to laptop 470. The hotspot management application may then be uploaded to mobile device 410 from laptop 470 via USB connection or any other appropriate wireless or wired connection. Once the hotspot management application has been installed or updated, the hotspot management application may attempt to verify whether the mobile device 410 is associated with a carrier-authorized hotspot or tethering data plan. If so, mobile hotspot or tethering functionality may be enabled on mobile device 410. If not, the user of mobile device 410 may be redirected to a captive portal for authorized tethering plan support. System 460 may additionally allow for a user to control guest management and/or customize the hotspot management application from laptop 470.

Thus, the present application provides for controlling access to a mobile hotspot on a mobile device utilizing a hotspot management application. The hotspot management application may provide kernel-level control over mobile devices configured to provide mobile hotspot or tethering support to subordinate tethered devices. Accordingly, concepts of the present application reduce revenue leakage through the control of unauthorized subordinate tethered connections and redirection to a captive portal for carrier-authorized tethering data plan support. Additionally, concepts of the present application enforce solution integrity through device management, provide policy support for flexible control of tethering policies, and provide for guest and user configuration of tethered and mobile hotspot connections to a mobile device according to both carrier-controlled and mobile device user-controlled policies.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for controlling access to a mobile hotspot on a mobile device utilizing a hotspot management application, said method comprising:
   detecting an unauthorized data traffic over a tethered link between said mobile device and a tethered device by obtaining a signature of said unauthorized data traffic and determining that said signature does not match an authorized signature stored in a memory of said mobile device, wherein said obtaining said signature of said unauthorized data traffic is carried out utilizing a rules engine, and wherein said rules engine is based on one or more carrier controlled tethering policies and one or more user controlled tethering policies;
   determining, using said signature of said unauthorized data traffic, an identity of an unauthorized application or device generating said unauthorized data traffic, wherein said determining of said identity of said unauthorized application or device includes looking up said signature of said unauthorized data traffic in a database; and
   redirecting, in response to said detecting, a user of said mobile device to a captive portal for carrier-authorized tethering data plan support.

2. The method of claim 1, further comprising:
   detecting when said hotspot management application is not installed on said mobile device; and
   automatically reinstalling said hotspot management application on said mobile device.

3. The method of claim 1, wherein said signature of said unauthorized data traffic is a hash of one of a binary of said unauthorized application or device, an executable filename, and a brand product name of said unauthorized application or device.

4. The method of claim 1, wherein said mobile device is one of a smartphone, a personal computer, a tablet computer and a personal digital assistant.

5. The method of claim 1, wherein said tethering link comprises one of a USB connection, a Bluetooth connection, a WiFi AP connection, a WiFi direct connection and an Ethernet connection.

6. The method of claim 1, further comprising reporting said signature of said unauthorized data traffic to a central server.

7. The method of claim 1, wherein said captive portal is hosted on said mobile device.

8. A mobile device for controlling access to a mobile hotspot utilizing a hotspot management application, said mobile device comprising:
   a memory storing an authorized signature;
   a hardware processor configured to:
      detect an unauthorized data traffic over a tethered link between said mobile device and a tethered device by obtaining a signature of said unauthorized data traffic and determining that said signature does not match said authorized signature stored in said memory of said mobile device, wherein said obtaining said signature of said unauthorized data traffic is carried out utilizing a rules engine, and wherein said rules engine is based on one or more carrier controlled tethering policies and one or more user controlled tethering policies;
      determine, using said signature of said unauthorized data traffic, an identity of an unauthorized application or device generating said unauthorized data traffic, wherein said determining said identity of said unauthorized application or device includes looking up said signature of said unauthorized data traffic in a database; and
      redirect, in response to detecting, a user of said mobile device to a captive portal for carrier-authorized tethering data plan support.

9. The mobile device of claim 8, wherein said processor is configured to:
   detect when said hotspot management application is not installed on said mobile device; and
   automatically reinstall said hotspot management application on said mobile device.

10. The mobile device of claim 8, wherein said signature of said unauthorized data traffic is a hash of one of a binary of said unauthorized application or device, an executable filename, and a brand product name of said unauthorized application or device.

11. The mobile device of claim 8, wherein said mobile device is one of a smartphone, a personal computer, a tablet computer and a personal digital assistant.

12. The mobile device of claim 8, wherein said tethering link comprises one of a USB connection, a Bluetooth connection, a WiFi AP connection, a WiFi direct connection and an Ethernet connection.

13. The mobile device of claim 8, wherein said processor is configured to report said signature of said unauthorized data traffic to a central server.

14. The mobile device of claim 8, wherein said captive portal is hosted on said mobile device.

* * * * *